(12) United States Patent
Hershey et al.

(10) Patent No.: US 7,269,201 B2
(45) Date of Patent: Sep. 11, 2007

(54) TIME-DELAYED TRANSMITTED REFERENCE SPREAD SPECTRUM TRANSMITTER WITH DIGITAL NOISE GENERATOR

(75) Inventors: John Erik Hershey, Ballston Lake, NY (US); Harold Woodruff Tomlinson, Jr., Scotia, NY (US); Kenneth Brakeley Welles II, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 873 days.

(21) Appl. No.: 10/681,705

(22) Filed: Oct. 9, 2003

(65) Prior Publication Data

US 2005/0078733 A1 Apr. 14, 2005

(51) Int. Cl.
*H04B 1/69* (2006.01)
(52) U.S. Cl. ...................................... 375/140
(58) Field of Classification Search ................ 375/140, 375/130, 146, 135, 295, 141; 380/270, 31, 380/35
See application file for complete search history.

(56) References Cited

U.S. PATENT DOCUMENTS 4,760,598 A * 7/1988 Ferrell .......................... 380/44
5,761,238 A    6/1998 Ross et al.
6,069,915 A *  5/2000 Hulbert ....................... 375/150
2003/0145196 A1* 7/2003 Heegard et al. ............. 713/150

* cited by examiner

*Primary Examiner*—Khai Tran
(74) *Attorney, Agent, or Firm*—Fletcher Yoder (57) ABSTRACT

Circuits are provided for transmitted reference spread spectrum systems using a noise-like digital sequence with delayed replica. The circuits produce the digital spreading sequences at extremely high speed, and are capable of providing a great degree of signal spreading. A first embodiment is composed of a low speed section and a high-speed section. This embodiment allows for greater power efficiency without sacrificing sequence speed. In addition, the embodiment also allows shaping of the spectrum of the high-speed digital sequence. Further, this embodiment generates an m-sequence and its near delay by storing decimated pieces of the entire m-sequence over a plurality of end-around circulating shift registers or so-called ring counters. The ring counters can be run at low speed and there is no exclusive-oring operation. A time-delayed transmitted reference spread spectrum transmitter is provided using digital noise generators that are capable of very high speed operation.

20 Claims, 6 Drawing Sheets

TIME-DELAYED TRANSMITTED REFERENCE SPREAD SPECTRUM TRANSMITTER WITH DIGITAL NOISE GENERATOR

STATEMENT REGARDING FEDERALLY SPONSORED RESEARCH & DEVELOPMENT

The United States Government may have certain rights in this invention pursuant to the National Institute of Standards and Technology (NIST) contract Number 70ANB0H3035 awarded by NIST.

BACKGROUND OF THE INVENTION

Conventional communications makes widespread use of spread spectrum techniques. Typically, each of these spread spectrum techniques has a mechanism for spreading baseband or message information over a much wider spectrum than is required to transmit the information. In the art, the term spread spectrum is understood as spectrum spreading in a manner that is independent of the content of the information being spread. This definition rules out such techniques as wideband FM for inclusion under the spread spectrum rubric.

Spread spectrum communication techniques have several advantages. First, by spreading the information over a much wider bandwidth than needed, it is possible to insinuate a certain degree of coverture in the communications and thus making it more difficult in general to detect the communications. Typically, this feature is of use in promoting communications security. A second advantage is that the spreading of information can be performed in a manner that is unpredictable by a third party and thus making it more difficult, in general, to defeat or jam the communications. Similarly, this feature promotes communications security. A third advantage is spectrum sharing. This feature allows a plurality of users to use the same spectrum at the same time. One disadvantage of this feature is a degradation in quality for any particular link as more simultaneous transmissions are conducted. The spectrum sharing feature is of interest to current commercial communications.

Typically, spread spectrum techniques can be categorized into at least three distinct classes that can be practiced individually or in combination. These classes include frequency hopping, time hopping, and direct sequence. Frequency hopping techniques modulate the baseband to different center frequencies within the shared spectrum space. Time hopping techniques encompass low duty cycle bursting of information. Direct sequence techniques are generally practiced by modulo-two adding a high-speed pseudorandom or noise-like binary spreading sequence to the digitized baseband information. This results in the modulo-two bit sum bit sequence having a bandwidth that is as wide as the bandwidth of the pseudorandom or noise-like spreading sequence.

Direct sequence spread spectrum techniques can be practiced using one of at least two techniques. The first technique is to generate the same pseudorandom or noise-like spreading sequence at both the transmitter and receiver with relative delay in order to match the propagation delay between transmitter and receiver. This technique requires that synchronization be established and maintained between transmitter and receiver at a precision dictated by the rate of the pseudorandom or noise-like sequence. Effecting this technique can be a significant technical challenge. The second technique to practice direct sequence spread spectrum is to transmit the pseudorandom or noise-like spreading sequence in addition to transmitting the modulo-two bit sum bit sequence. Depending upon its implementation, this second technique can require more power or more bandwidth than the first way, but an advantage of this second technique is that synchronization is generally less difficult.

In spread spectrum communications systems, in particular time-delayed transmitted reference spread spectrum communication systems, it is necessary to generate a wideband noise-like carrier and its time-delayed replica. There is a further desire to provide spectral shaping to the wideband carrier in order to avoid transmitting significant energy within spectrum reserved and protected for other communication users. Further, it would be desirable to generate the wideband carrier and its time-delayed replica deterministically by a finite state digital machine capable of running at a very high speed.

BRIEF SUMMARY OF THE INVENTION

In one embodiment, a circuit for producing a time-delayed transmitted reference spread spectrum signal is provided. The circuit comprises a first and second shift registers having primitive polynomial feedback circuits. A delay module is connected to the output of the first shift register. A modulator is connected to an output of the delay module. A narrowband message signal is connected to the modulator. A summer is connected to an output of the second shift register. An output of the modulator is connected to the summer, and the summer produces the time-delayed transmitted reference spread spectrum signal as an output.

In another embodiment, a circuit for producing a time-delayed transmitted reference spread spectrum signal is provided. The circuit comprises a shift register having a primitive polynomial feedback circuit. A modulo-two adder is connected to predetermined bits of the shift register. A modulator is connected to an output of the modulo-two adder. A narrowband message signal is connected to the modulator. A summer is connected to an output of the modulator and a sequence generated by the shift register wherein an output of the summer produces the time-delayed transmitted reference spread spectrum signal.

In even another embodiment, a circuit for producing a time-delayed transmitted reference spread spectrum signal is provided. The circuit comprises a plurality of end-around circulating shift registers. A control circuit is connected to the end-around circulating shift registers for controlling a circulation of bits in the end-around circulating shift registers. A sampling circuit is connected to selected ones of the plurality of end-around circulating shift registers for sampling the selected end-around circulating shift registers. The sampling is chosen to provide a noise-like digital sequence and its delayed replica to produce the time-delayed transmitted reference spread spectrum signal.

BRIEF DESCRIPTION OF THE DRAWINGS

FIG. 5 is a block diagram view of one exemplary embodiment of a 15-bit end-around circulating shift register or ring counter, and.

DETAILED DESCRIPTION OF THE INVENTION

Figure 1:
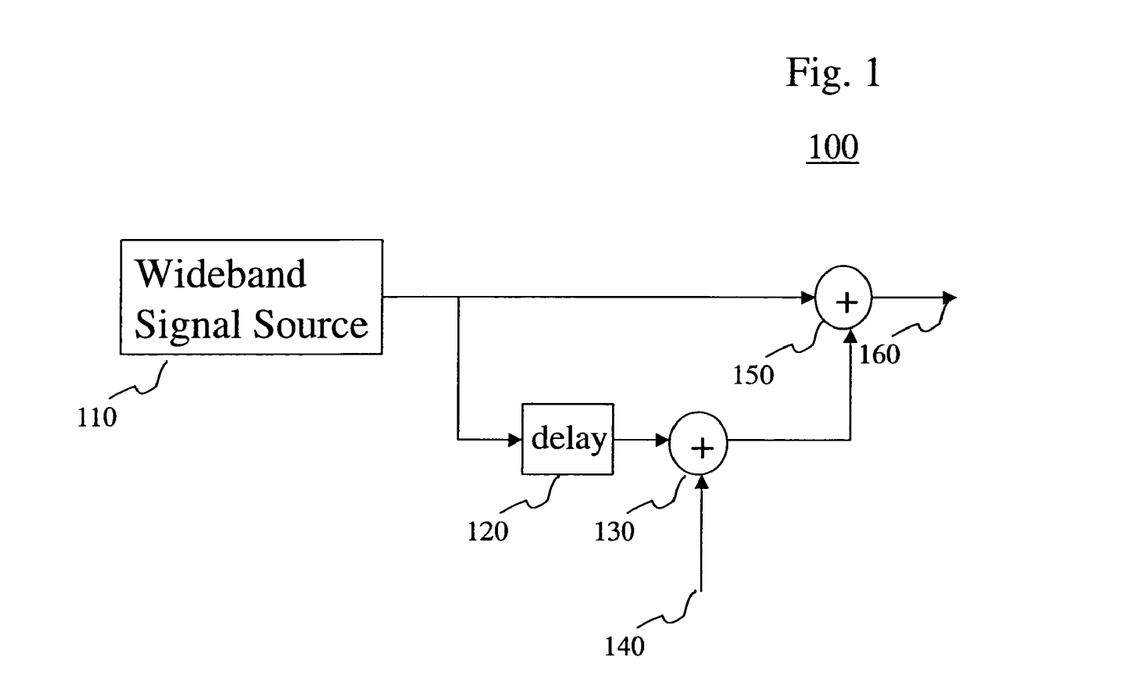
FIG. 1 is a block diagram view of one exemplary embodiment of a time-delayed transmitted reference transmitter.

As shown in FIG. 1, one embodiment of a time-delayed transmitted reference system transmitter 100 comprises a wideband signal source 110 that generates the wideband reference signal. The wideband reference signal is delayed by a delay element 120. The delayed reference signal enters a modulator 130 where it is modulated by a relatively narrowband message signal 140. The result of the modulation is added to the reference signal in an adder 150 forming a summed signal 160 that may then be transmitted.

In direct sequence techniques, it should be appreciated that it is important to select an appropriate spectrum spreading sequence. In particular in one embodiment, a spectrum spreading sequence should be sufficiently noise-like and provide the degree of spreading desired. It is an engineering challenge to design hardware that produces a very high-speed sequence because higher speeds generally require higher amounts of power. As such, the design of the hardware may affect battery life and require ever larger and ever more efficient heat dissipation techniques. Further, since the system of interest is a time-delayed transmitted reference spread spectrum communication system, it can be necessary to generate or reproduce the spreading sequence at the time-delay of the system. Typically, this delay is typically small with respect to the sequence's period.

In one embodiment, a digital sequence for accomplishing spectrum spreading can be provided by an m-sequence. The m-sequence can of length $2^n-1$ and can be specified by a primitive polynomial where n is the degree of the primitive polynomial specifying the sequence. The m-sequence has the unusual and, for spread spectrum applications, desirable property that its cyclic autocorrelation function is bi-valued and therefore its power spectral density has equal amounts of power at each of its $2^n-1$ frequencies with the exception of the zero frequency.

Figure 2:
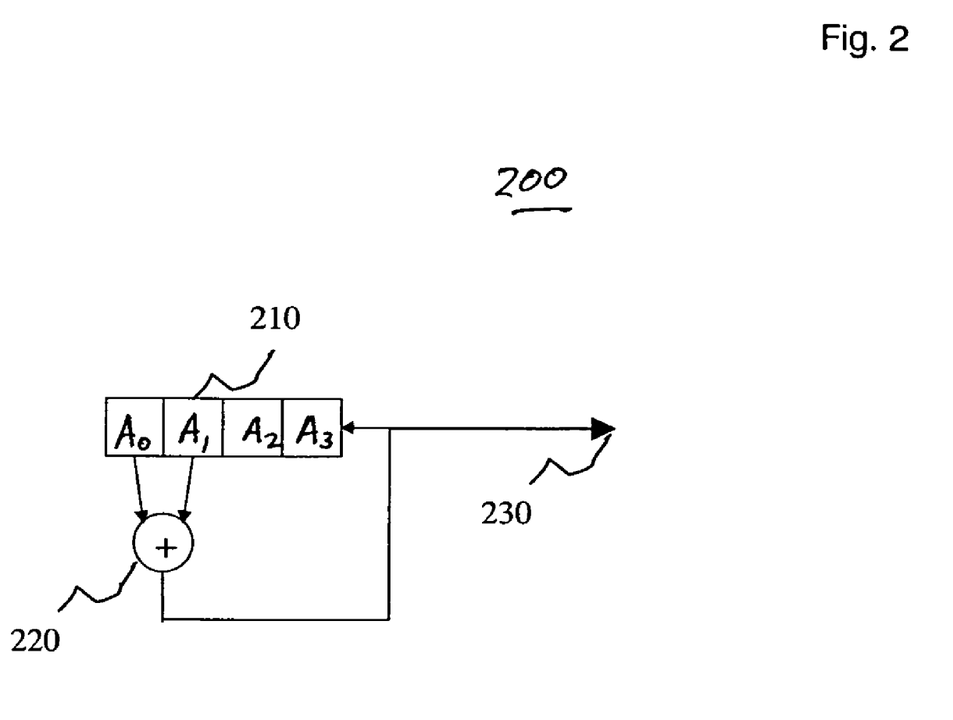
FIG. 2 is a block diagram view of one exemplary embodiment of a 15-bit m-sequence generator.

In one embodiment, as shown in FIG. 2, the m-sequence can be generated sequentially by an m-sequence generator 200 comprising a shift register 210 having n stages with modulo-two feedback consisting of the sum of one or more pairs of stages. The feedback for implementing an m-sequence using a shift register 210 containing zeros and ones is built using at least one exclusive-or gate 220. As further shown in FIG. 2, in one example, the primitive polynomial $x^4+x^3+1$ specifies the shift register 210 and feedback. In this embodiment, the shift register 210 has four-stages and is fed input bits to the $A_3$ position and shifts the bits from the $A_3$ position to the $A_0$. The input bits are successively formed using exclusive-or gate 220 to exclusive- or the contents of the $A_0$ and the $A_1$ positions of the four-stage shift register 210. The exclusive- or gate 220 operates according to Table 1. If the shift register 210 is loaded with four ones and then clocked, it generates the repeating m-sequence 0 0 0 1 0 0 1 1 0 1 0 1 1 1 1 which is output of gate output line 230.

TABLE 1

| INPUT 1 | INPUT 2 | OUTPUT OF EXCLUSIVE-OR LOGIC GATE |
|---------|---------|-----------------------------------|
| 0 | 0 | 0 |
| 0 | 1 | 1 |
| 1 | 0 | 1 |
| 1 | 1 | 0 |

Figure 3:
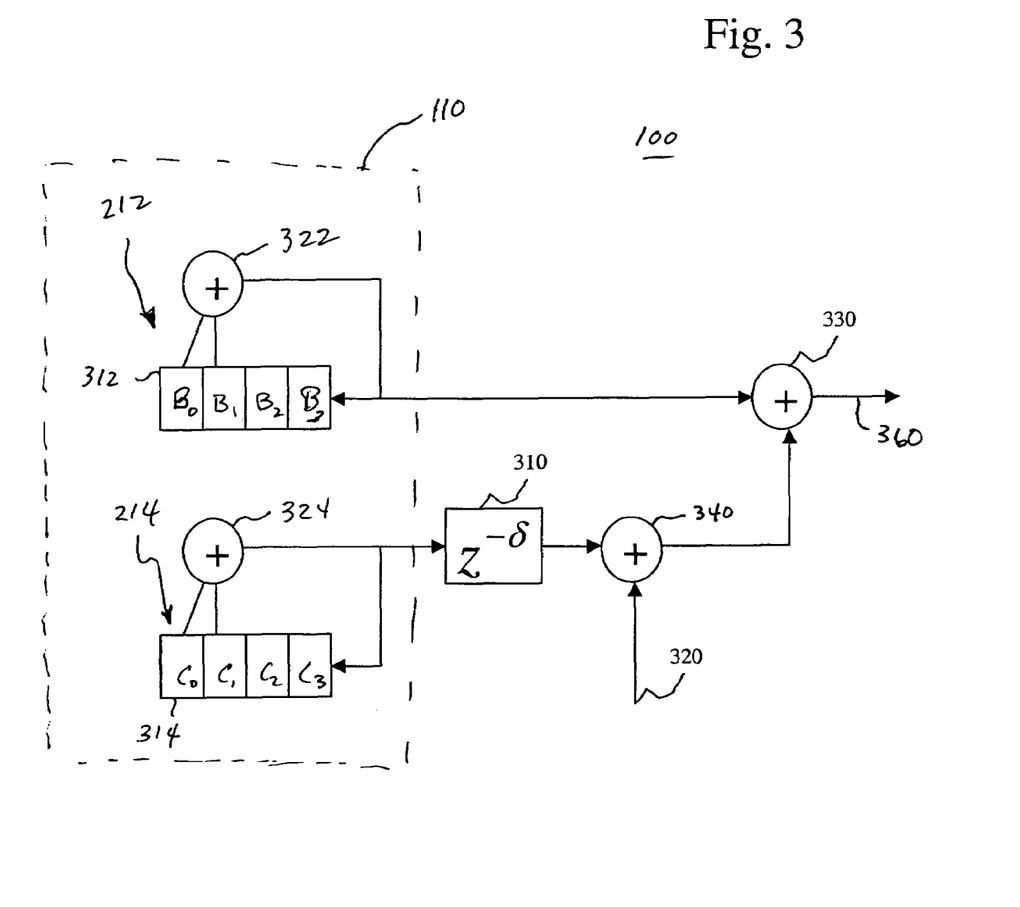
FIG. 3 is a block diagram view of a second exemplary embodiment a time-delayed transmitted reference transmitter.

In another embodiment, as shown in FIG. 3, m-sequence generators 212 and 214 can serve as a wideband signal source 110 in a time-delayed transmitted reference system transmitter 100. In FIG. 3, m-sequence generator 212 comprises shift register 312 and exclusive- or gate 322. The m-sequence generator 214 comprises shift register 314 and exclusive- or gate 324. The shift registers 312 and 314 are preset to the same or similar settings and then run at the same or similar rate to produce identical or similar m-sequences. The m-sequence stream from m-sequence generator 214 is delayed by δ-clock times in the delay unit 310. In one embodiment, the delay unit 310 may be realized by a delta (δ)-stage shift register clocked at the same or similar rate as the individual m-sequence generators. The output of delay unit 310 is modulated by as relatively narrowband message signal 320 in modulator 340. The output of the modulator 340 is combined with the undelayed reference signal in adder 330 to produce output 360.

Figure 4:
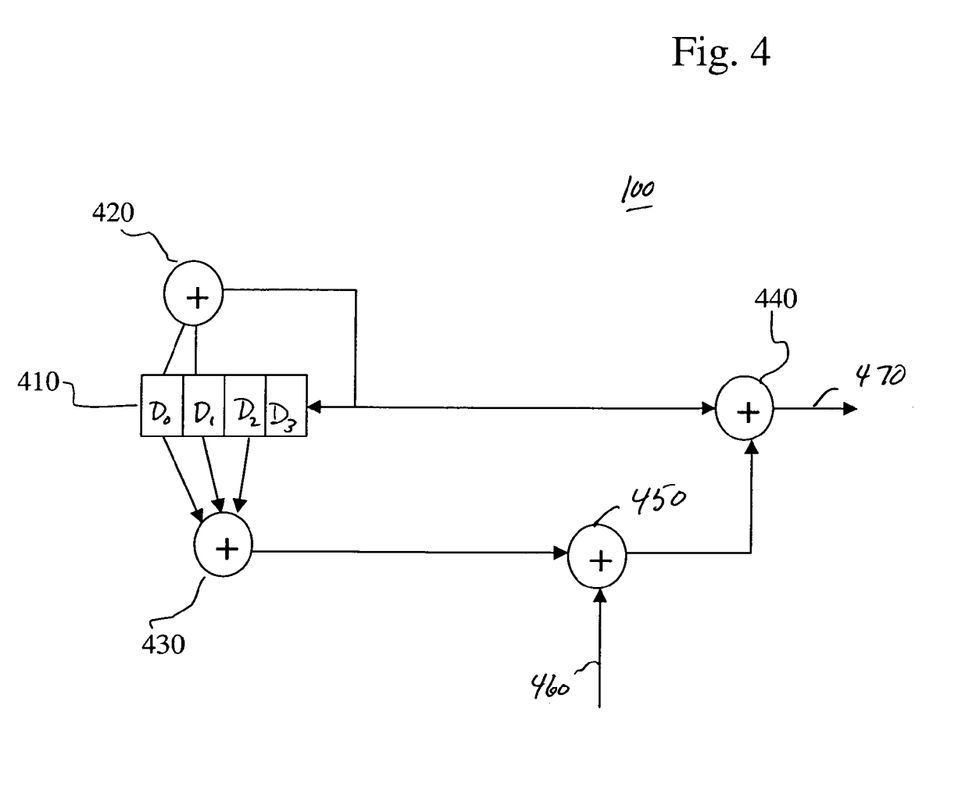
FIG. 4 is a block diagram view of a third exemplary embodiment of a time-delayed transmitted reference transmitter.

In another embodiment, δ-clock times delayed replacement of the wideband signal source may also be achieved by modulo-two summing together the contents of the appropriate stages of the shift registers 312 and 314. It should be appreciated that the mathematics for selecting the appropriate combination of stages can adjusted in order to produce a given delay. In another exemplary embodiment, as shown in FIG. 4, an architecture of a time-delayed transmitted reference system transmitter 100 is provided that is based on the primitive polynomial $x^4+x^3+1$ with δ chosen to be 10. It should be appreciated that, this embodiment, the choice of δ is used to present an example and that it should not be interpreted as limiting the scope of the invention in any way. With respect to FIG. 4, a four stage shift register 410 has its first and second stages ($D_0$ and $D_1$) exclusive-ored together by the two-input exclusive- or gate 420 and the resultant bit is fed back into the fourth stage ($D_3$) of the shift register 410. This configuration generates the m-sequence corresponding to the primitive polynomial $x^4+x^3+1$ The m-sequence produced is used as the undelayed reference and is input to the combiner 440. Attached to the first, second, and third stages ($D_0$, $D_1$ and $D_2$) of the four stage shift register 420 is a three input mod-2 binary adder 430. This adder 430 outputs a zero if an even number of ones are input to it, and the adder 430 outputs a one otherwise. The output of adder 430 is supplied to a modulator 450 that is also connected to a relatively narrowband message signal 460. The output of modulator 450 is connected to combiner 440 that outputs a combined signal 470. In one embodiment, the mod-2 binary adder 430 may be built out of a tree of exclusive- or gates. In another embodiment, one such realization would be to exclusive- or the contents of stage one ($D_0$) and stage two ($D_1$) of the four-stage shift register 420 and exclusive- or the output of that exclusive- or to the content of stage three ($D_2$).

Figure 5:
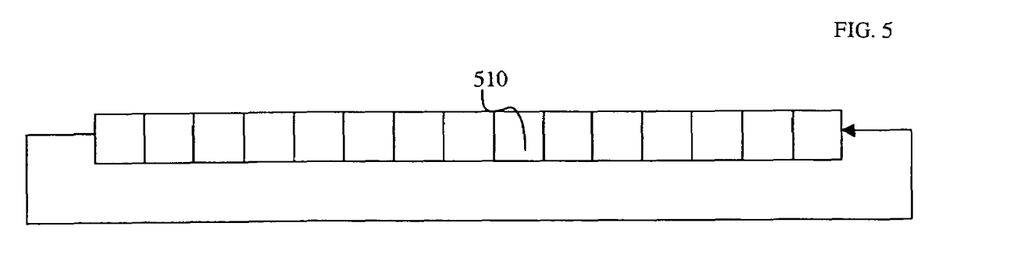

In one embodiment, it should be appreciated that the m-sequence and any delay desired could be produced by simply storing the m-sequence in a $2^n-1$ stage end-around circulating shift register or ring counter. As shown in FIG. 5, an example for n=4 is provided. In this embodiment, the shift register 510 is 15 bits long as $2^4-1=15$. A delayed version of the m-sequence generated by this method is instantly realized by merely selecting a tap that is at the delay distance required from the tap from which the m-sequence is first taken. It should be appreciated that this approach does not require any exclusive- or computation. Further, this approach does require, however, that the entire pseudorandom or noise-like sequence be shifted for every bit produced.

Figure 6:
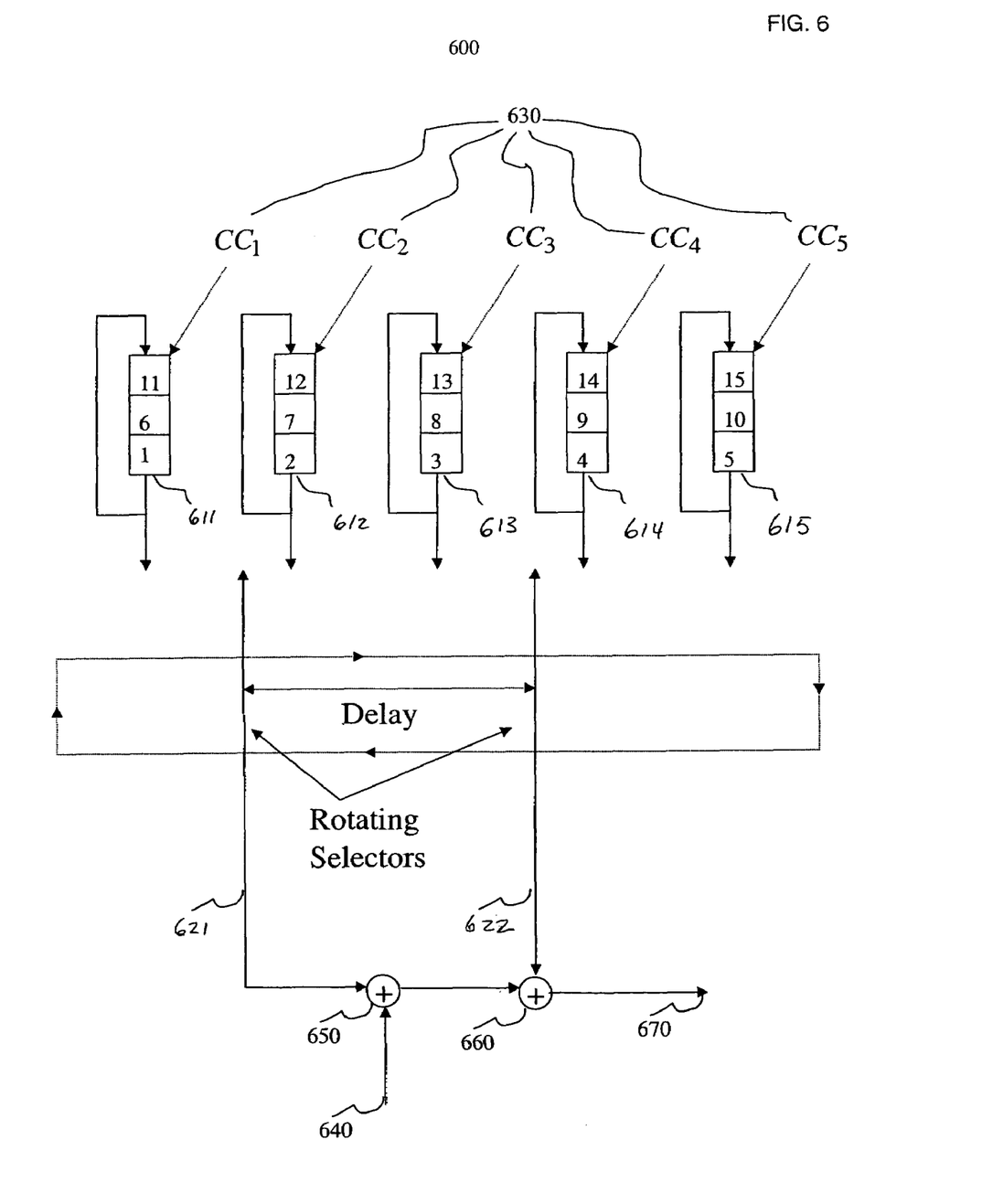
FIG. 6 is a block diagram view of a fourth exemplary embodiment of a time-delayed transmitted reference transmitter.

In another embodiment, as shown in FIG. 6, the generation of a pseudorandom or noise-like sequence is provided and consists of a structure 600. In this embodiment, for example, the different delays desired between the sequence and its replica are few and bounded by a small distance. This approach depends on eploiting the fact that $2^n-1$ may have a small factor. Table 2 lists the factors of $2^n-1$ for n=4,5,6,7,8,9,10,11,12.

TABLE 2

| n | $2^n - 1$ | Factors of $2^n - 1$ |
|---|---|---|
| 4 | 15 | 3 · 5 |
| 5 | 31 | prime |
| 6 | 63 | $3^2 \cdot 7$ |
| 7 | 127 | prime |
| 8 | 255 | 3 · 5 · 17 |
| 9 | 511 | 7 · 73 |
| 10 | 1023 | 3 · 11 · 31 |
| 11 | 2047 | 23 · 89 |
| 12 | 4095 | $3^2 \cdot 5 \cdot 91$ |

In general, for an m-sequence of length $2^n-1$, if $2^n-1=p \cdot q$, where p and q are integera, the sequence can be produced by storing the decimated m-sequence in q end-around circulating shift registers or component registers 611, 612, 613, 614 and 615 each of length p, and generating the m-sequence by sequential sampling and rotation of the q component registers wherein q is the number of shift registers. For example, the m-sequence considered earlier, 1 1 1 1 0 0 0 1 0 0 1 1 0 1 0, can be realized by the structure as shown (initialized) in FIG. 6. In this embodiment, the fact that $2^4-1=3 \cdot 5$ has been used, and the selection of p=3 and q=5 has been made. To do the decimations, bits 1, 6, 11 are chosen and stored in component register 611, bits, 2, 7, 12 and store them in component register 612, bits 3, 8, 13 and store them in component register 613, bits 4, 9, 14 and store them in component register 614, and bits, 5, 10, 15 and store them in component register 615. To produce the sequence, the leftmost component register is sampled retrieving bit 1, then the next component register to the right is sampled, retrieving bit 2, and so on in a circular manner. Component register clocks ($CC_1$, $CC_2$, . . . , $CC_5$) 630 provide rotate pulses to their respective component registers after the m-sequence bit has been retrieved and before the next time its respective component register will be sampled. The component register clocks may be realized by circulating a single one in a q-stage ring counter.

The delayed m-sequence can be retrieved by simply sampling the same stages but delayed by the desired delay. In FIG. 6, the component registers are shown in their initialized condition with the numbers of the m-sequence bits properly placed in the component registers. Sampling is accomplished by rotating selectors 621 and 622. One rotating selector 621 provides the time-delayed reference. This time-delayed reference is modulated by the narrowband message signal 640 in the modulator 650. In this embodiment, modulator 650 can comprise an exclusive- or gate since the signals to this point are all binary. The modulated time-delayed reference is then combined in combiner 660 with the undelayed reference that is provided on rotating selector 622. The result 670 of the combination is a summed signal that may be transmitted.

In this embodiment, for a q to be an appropriate selection, it should first be a factor of $2^n-1$. Additionally, because the component registers are to operate at a much slower speed than the production of the m-sequence, the value of q should also be at least as great as the ratio of the m-sequence clocking rate to the comparatively low speed component clocking. Further, because the component registers are not to be rotated until the rotating selector retrieving the delayed version of the m-sequence has sampled the component register, the value of q−δ should be at least as great as the ratio of the m-sequence clocking rate to the comparatively low speed component register clocking where δ is the maximum delay that will be used.

It should be appreciated that, in this embodiment, the $2^n-1$ bit sequence need not be restricted to an m-sequence. In yet another embodiment, the component registers of the device shown in FIG. 6 may be initialized with bits of a sequence tailored to coloring the power spectral density of the sequence produced. This embodiment can be quite useful for insinuating an essential null in the power spectral density of the sequence produced. Such an approach can be useful in order to comport with regulations requiring islands in the transmitted spectrum to be protected.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A circuit for producing a time-delayed transmitted reference spread spectrum signal comprising:
   first and second shift registers having primitive polynomial feedback circuits;
   a delay module connected to the output of the first shift register;
   a modulator connected to an output of said delay module;
   a narrowband message signal connected to said modulator;
   a summer connected to an output of the second shift register; and
   wherein an output of said modulator connected to said summer, and wherein the summer produces the time-delayed transmitted reference spread spectrum signal as an output.

2. The circuit of claim 1 wherein the first and second shift registers each have the same bit size capacity.

3. The circuit of claim 1 wherein the first and second shift registers each comprise a bit size capacity of at least four bits.

4. The circuit of claim 1 wherein the first and second shift registers are preset wherein each have a first predetermined setting and wherein the first and second shift registers are each run at a predetermined clock rate.

5. The circuit of claim 4 wherein the delay module comprises a delta (δ) stage shifter register.

6. The circuit of claims 5 wherein the delta (δ) stage shift register is clocked at the predetermined clock rate.

7. The circuit of claim 1 wherein the polynomial feedback circuits comprise a first exclusive- or logic gate connected to the first shift register and a second exclusive- or logic gate connected to the second shift register.

8. A circuit for producing a time-delayed transmitted reference spread spectrum signal comprising:
   a shift register having a primitive polynomial feedback circuit;
   a modulo-two adder connected to predetermined bits of said shift register;
   a modulator connected to an output of said modulo-two adder;
   a narrowband message signal connected to said modulator; and
   a summer connected to an output of said modulator and a sequence generated by said shift register wherein an output of the summer produces the time-delayed transmitted reference spread spectrum signal.

9. The circuit of claim 8 wherein the shift register comprises a bit size capacity of at least four bits.

10. The circuit of claim 8 wherein the primitive polynomial feed back circuit comprises an exclusive- or gate.

11. The circuit of claim 8 wherein the shift register comprises a bit size of four bits.

12. The circuit of claim 11 wherein the modulo-two adder is connected a first, second and third bit of the shift register.

13. The circuit of claim 11 wherein the polynomial feedback circuit is connected to the first and second bits of the shift register.

14. The circuit of claim 11 wherein an output of the polynomial feedback circuit is connected to an output of the shift register.

15. A circuit for producing a time-delayed transmitted reference spread spectrum signal comprising:
   a plurality of end-around circulating shift registers;
   a control circuit connected to the plurality of end-around circulating shift registers for controlling a circulation of bits in said end-around circulating shift registers; and
   a sampling circuit connected predetermined ones of the plurality of the end-around circulating shift registers for sampling the predetermined end-around circulating shift registers, said sampling being chosen to provide a noise-like digital sequence and its delayed replica for producing the time-delayed transmitted reference spread spectrum signal.

16. The circuit of claim 15 wherein the sampling circuit twice samples the end-around circulating shift registers.

17. The circuit of claim 15 wherein the control circuit comprises a plurality of component register clocks wherein each of the plurality of component register clocks are individually connected to unique ones of the plurality of end-around shift registers.

18. The circuit of claim 15 wherein the sampling circuit comprises a first and second rotating selector.

19. The circuit of claim 18 wherein said first rotating selector is delayed a predetermined time from said second rotating selector.

20. The circuit of claim 18 wherein an output of the first rotating selector is connected to a modulator, said modulator being connected to a narrow band message signal wherein an output of said modulator and an output of said second rotating selector are connected to a combiner.

* * * * *